United States Patent
Zhou et al.

(10) Patent No.: US 12,171,018 B2
(45) Date of Patent: Dec. 17, 2024

(54) PRIORITY BASED DECISION FOR CONFIGURED TRANSMISSION CANCELLATION BY DYNAMIC GRANT

(71) Applicant: QUALCOMM Incorporated, San Diego, CA (US)

(72) Inventors: Yan Zhou, San Diego, CA (US); Konstantinos Dimou, San Francisco, CA (US); Seyedkianoush Hosseini, San Diego, CA (US); Yi Huang, San Diego, CA (US); Wei Yang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 17/395,642

(22) Filed: Aug. 6, 2021

(65) Prior Publication Data
US 2022/0046658 A1 Feb. 10, 2022

Related U.S. Application Data

(60) Provisional application No. 63/063,217, filed on Aug. 7, 2020.

(51) Int. Cl.
*H04W 72/566* (2023.01)
*H04W 72/1268* (2023.01)
*H04W 72/1273* (2023.01)
*H04W 72/23* (2023.01)

(52) U.S. Cl.
CPC ..... *H04W 72/569* (2023.01); *H04W 72/1268* (2013.01); *H04W 72/1273* (2013.01); *H04W 72/23* (2023.01)

(58) Field of Classification Search
CPC ......... H04W 72/1242; H04W 72/1268; H04W 72/1273; H04W 72/14
See application file for complete search history.

(56) References Cited

U.S. PATENT DOCUMENTS

| | | | |
|---|---|---|---|
| 2020/0008227 A1* | 1/2020 | Lee | H04W 72/0446 |
| 2020/0260391 A1* | 8/2020 | Zhou | H04W 52/48 |
| 2021/0136565 A1* | 5/2021 | Saber | H04L 1/0003 |
| 2021/0212039 A1* | 7/2021 | Takeda | H04W 72/1268 |
| 2022/0014957 A1* | 1/2022 | Guo | H04W 72/21 |

(Continued)

*Primary Examiner* — Kevin M Cunningham
(74) *Attorney, Agent, or Firm* — QUALCOMM Incorporated

(57) ABSTRACT

Aspects of the present disclosure relate to wireless communications, and more particularly, to mechanisms for priority based decisions regarding when to cancel or maintain configured transmissions that overlap with dynamically scheduled transmissions. An example method performed by a user equipment (UE) generally includes determining that a configured transmission overlaps in time with a dynamically scheduled transmission, and deciding whether to cancel or maintain the configured transmission based on a priority of at least one of the configured transmission or an uplink transmission associated with the dynamically scheduled transmission when the time between an end of a downlink control information (DCI) that scheduled the dynamically scheduled transmission and a start of the configured transmission is greater than a threshold processing time.

11 Claims, 12 Drawing Sheets

```
802
DETERMINING THAT A CONFIGURED TRANSMISSION OVERLAPS IN TIME WITH
A DYNAMICALLY SCHEDULED TRANSMISSION

804
DECIDING WHETHER TO CANCEL OR MAINTAIN THE CONFIGURED
TRANSMISSION BASED ON A PRIORITY OF AT LEAST ONE OF THE
CONFIGURED TRANSMISSION OR AN UPLINK TRANSMISSION
ASSOCIATED WITH THE DYNAMICALLY SCHEDULED TRANSMISSION
WHEN THE TIME BETWEEN AN END OF A DOWNLINK CONTROL
INFORMATION (DCI) THAT SCHEDULED THE DYNAMICALLY SCHEDULED
TRANSMISSION AND A START OF THE CONFIGURED TRANSMISSION IS
GREATER THAN A THRESHOLD PROCESSING TIME.
```

(56) References Cited

U.S. PATENT DOCUMENTS

| | | | |
|---|---|---|---|
| 2022/0015126 A1* | 1/2022 | Saber | H04W 72/1289 |
| 2022/0174721 A1* | 6/2022 | Oviedo | H04L 1/1861 |
| 2023/0283424 A1* | 9/2023 | Rao | H04L 5/0048 |
| | | | 370/329 |

* cited by examiner

Table1: UL Tx overlaps DL DG

| Priority of Configured UL Tx | Priority of UL Tx Associated with DL DG | Cancellation Rule |
|---|---|---|
| Low | Low | Cancel Configured UL Tx |
| Low | High | Cancel Configured UL Tx |
| High | Low | Maintain Configured UL Tx |
| High | High | Cancel/Maintain Configured UL Tx |

FIG. 10A

Table2: configured DL Rx overlaps UL DG

| Priority of UL Tx associated with Configured DL Rx | Priority of DG UL Tx | Cancellation Rule |
|---|---|---|
| Low | Low | Cancel Configured DL Tx |
| Low | High | Cancel Configured DL Tx |
| High | Low | Maintain Configured DL Tx |
| High | High | Cancel/Maintain Configured DL Tx |

FIG. 10B

PRIORITY BASED DECISION FOR CONFIGURED TRANSMISSION CANCELLATION BY DYNAMIC GRANT

PRIORITY CLAIM

This application claims benefit of and the priority to U.S. Provisional Application No. 63/063,217 filed on Aug. 7, 2020, which is expressly incorporated by reference in its entirety as if fully set forth below and for all applicable purposes.

TECHNICAL FIELD

Aspects of the present disclosure relate to wireless communications, and more particularly, to mechanisms for priority based decisions regarding when to cancel or maintain configured transmissions that overlap with dynamically scheduled transmissions.

INTRODUCTION

Wireless communications systems are widely deployed to provide various telecommunication services such as telephony, video, data, messaging, and broadcasts. Typical wireless communications systems may employ multiple-access technologies capable of supporting communications with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communications system may include a number of base stations, each simultaneously supporting communications for multiple communications devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communications system may include a number of distributed units (DUs) (e.g., edge units (EUs), edge nodes (ENs), radio heads (RHs), smart radio heads (SRHs), transmission reception points (TRPs), etc.) in communications with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

Aspects of the present disclosure relate to wireless communications, and more particularly, to mechanisms for activating semi-static or periodic occasions for uplink or downlink communication.

Certain aspects of the present disclosure provide a method for wireless communications by a user equipment (UE). The method generally includes determining that a configured transmission overlaps in time with a dynamically scheduled transmission, and deciding whether to cancel or maintain the configured transmission based on a priority of at least one of the configured transmission or an uplink transmission associated with the dynamically scheduled transmission when the time between an end of a downlink control information (DCI) that scheduled the dynamically scheduled transmission and a start of the configured transmission is greater than a threshold processing time.

Certain aspects of the present disclosure are directed to an apparatus for wireless communication by a user equipment (UE). The apparatus generally includes a memory and at least one processor coupled to the memory, the memory and the at least one processor being configured to determine that a configured transmission overlaps in time with a dynamically scheduled transmission and decide whether to cancel or maintain the configured transmission based on a priority of at least one of the configured transmission or an uplink transmission associated with the dynamically scheduled transmission when the time between an end of a downlink control information (DCI) that scheduled the dynamically scheduled transmission and a start of the configured transmission is greater than a threshold processing time.

Certain aspects of the present disclosure are directed to an apparatus for wireless communication by a user equipment (UE). The apparatus generally includes means for determining that a configured transmission overlaps in time with a dynamically scheduled transmission and means for deciding whether to cancel or maintain the configured transmission based on a priority of at least one of the configured transmission or an uplink transmission associated with the dynamically scheduled transmission when the time between an end of a downlink control information (DCI) that scheduled the dynamically scheduled transmission and a start of the configured transmission is greater than a threshold processing time.

Certain aspects of the present disclosure are directed to a computer readable medium having instructions stored thereon for determining that a configured transmission overlaps in time with a dynamically scheduled transmission and deciding whether to cancel or maintain the configured transmission based on a priority of at least one of the configured transmission or an uplink transmission associated with the dynamically scheduled transmission when the time between an end of a downlink control information (DCI) that scheduled the dynamically scheduled transmission and a start of the configured transmission is greater than a threshold processing time.

Certain aspects of the present disclosure provide a method for wireless communications by a network entity. The method generally includes configuring a user equipment (UE) for a configured transmission, sending the UE a grant dynamically scheduling a transmission, determining that the configured transmission overlaps in time with the dynamically scheduled transmission, and deciding whether the UE is to cancel or maintain the configured transmission based on a priority of at least one of the configured transmission or an uplink transmission associated with the dynamically scheduled transmission when the time between an end of a downlink control information (DCI) that scheduled the dynamically scheduled transmission and a start of the configured transmission is greater than a threshold processing time.

Certain aspects of the present disclosure are directed to an apparatus for wireless communication by a network entity. The apparatus generally includes a memory and at least one processor coupled to the memory, the memory and the at least one processor being configured to configure a user equipment (UE) for a configured transmission, send the UE a grant dynamically scheduling a transmission, determine that the configured transmission overlaps in time with the dynamically scheduled transmission, and decide whether the UE is to cancel or maintain the configured transmission based on a priority of at least one of the configured transmission or an uplink transmission associated with the dynamically scheduled transmission when the time between an end of a downlink control information (DCI) that scheduled the dynamically scheduled transmission and a start of the configured transmission is greater than a threshold processing time.

Certain aspects of the present disclosure are directed to an apparatus for wireless communication by a network entity. The apparatus generally includes means for configuring a user equipment (UE) for a configured transmission, means for sending the UE a grant dynamically scheduling a transmission, means for determining that the configured transmission overlaps in time with the dynamically scheduled transmission, and means for deciding whether the UE is to cancel or maintain the configured transmission based on a priority of at least one of the configured transmission or an uplink transmission associated with the dynamically scheduled transmission when the time between an end of a downlink control information (DCI) that scheduled the dynamically scheduled transmission and a start of the configured transmission is greater than a threshold processing time.

Certain aspects of the present disclosure are directed to a computer readable medium having instructions stored thereon for configuring a user equipment (UE) for a configured transmission, sending the UE a grant dynamically scheduling a transmission, determining that the configured transmission overlaps in time with the dynamically scheduled transmission, and deciding whether the UE is to cancel or maintain the configured transmission based on a priority of at least one of the configured transmission or an uplink transmission associated with the dynamically scheduled transmission when the time between an end of a downlink control information (DCI) that scheduled the dynamically scheduled transmission and a start of the configured transmission is greater than a threshold processing time.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 10A illustrates example priority rules for deciding when to cancel or maintain a configured uplink transmission that overlaps with a dynamically scheduled downlink transmission, in accordance with certain aspects of the present disclosure.

FIG. 10B illustrates example priority rules for deciding when to cancel or maintain a configured downlink transmission that overlaps with a dynamically scheduled uplink transmission, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
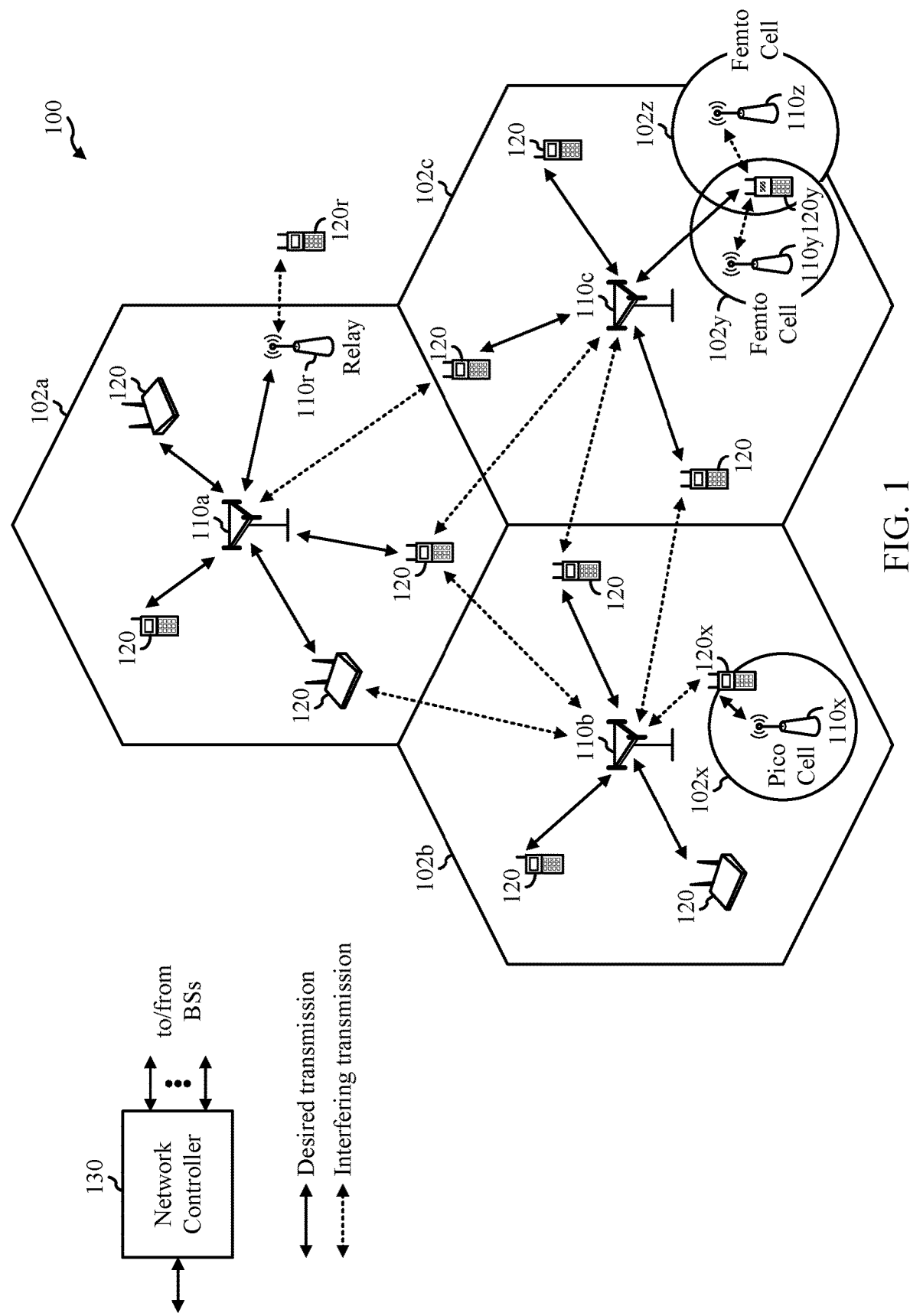
FIG. 1 is a block diagram conceptually illustrating an example telecommunications system, in accordance with certain aspects of the present disclosure.

Aspects of the present disclosure relate to wireless communications, and more particularly, to mechanisms for priority based decisions regarding when to cancel or maintain configured transmissions that overlap with dynamically scheduled transmissions.

For example, a UE may determine that a configured transmission overlaps in time with a dynamically scheduled transmission and decide to maintain the configured transmission based on a priority of the configured transmission when a condition is met. In some cases, the condition may be the threshold processing time is less than the time between an end of a downlink control information (DCI) that scheduled the dynamically scheduled transmission and a start of the configured transmission. The configured transmission may be determined through a variety of manners such as a radio resource control (RRC) message, DCI activing the configured transmission, or a type of information carried in the configured transmission.

Aspects of the present disclosure provide apparatus, methods, processing systems, and computer readable mediums for new radio (NR) (NR access technology or $5^{th}$ generation (5G) technology).

NR may support various wireless communications services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communications networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communications systems, such as 5G and later, including NR technologies.

Example Wireless System

FIG. 1 illustrates an example wireless network 100 in which aspects of the present disclosure may be performed. For example, one or more UEs 120 of the wireless network 100 may be configured to perform operations 800 of FIG. 8. Similarly, a base station 110 of the wireless network 100 may be configured to perform operations 900 of FIG. 9.

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communications coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communications coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. ABS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communications between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communications. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communications network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
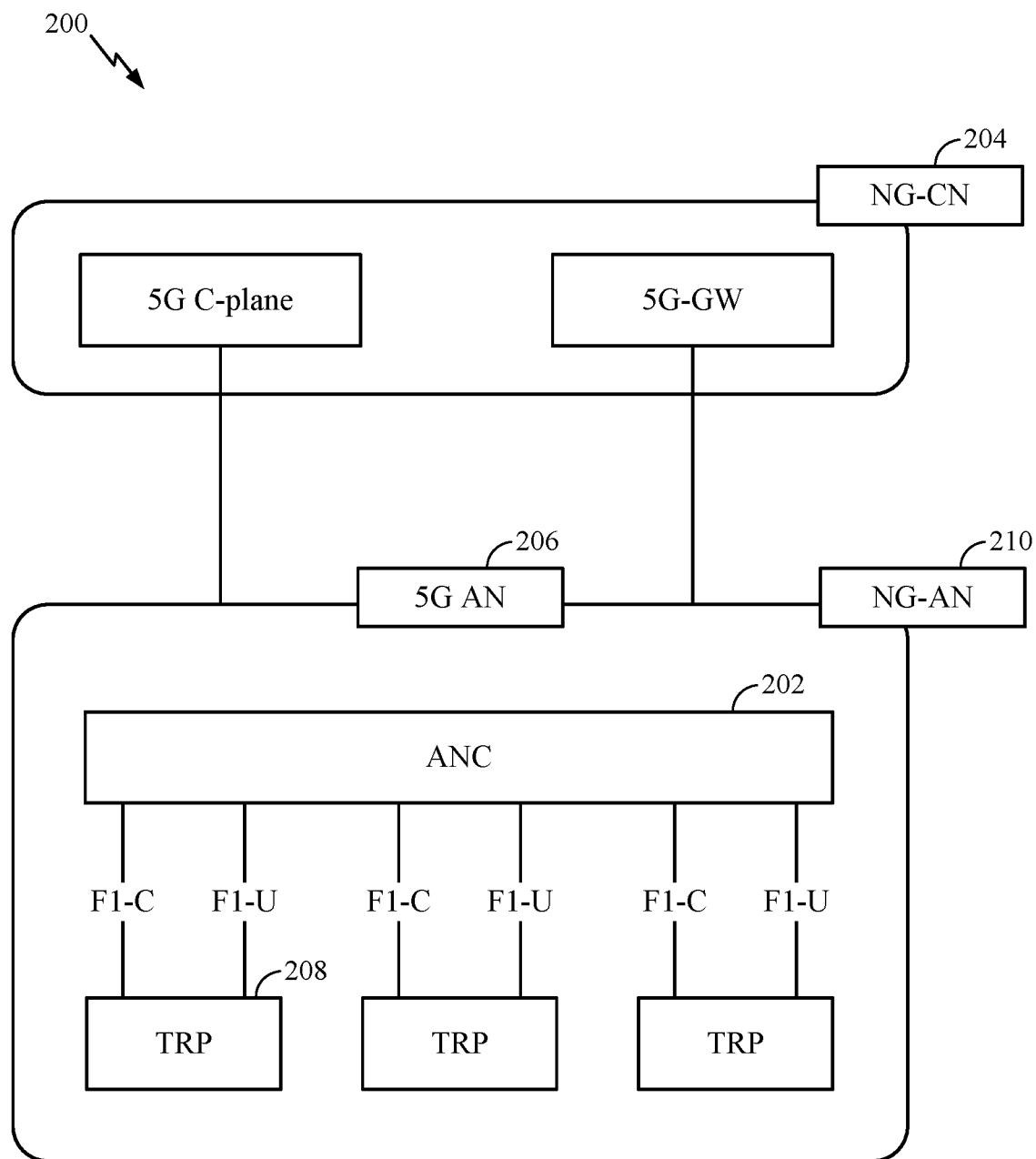
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communications system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
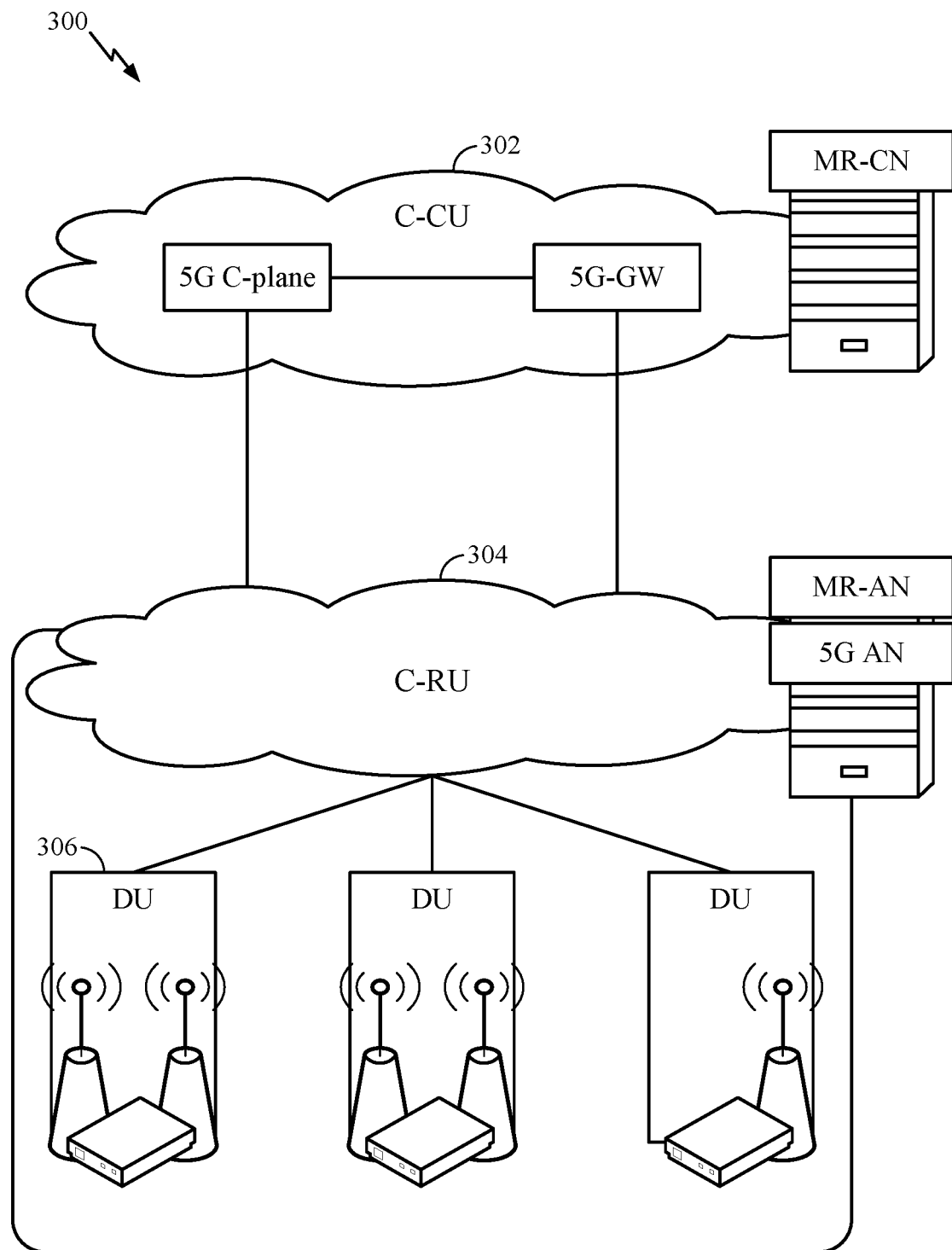
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
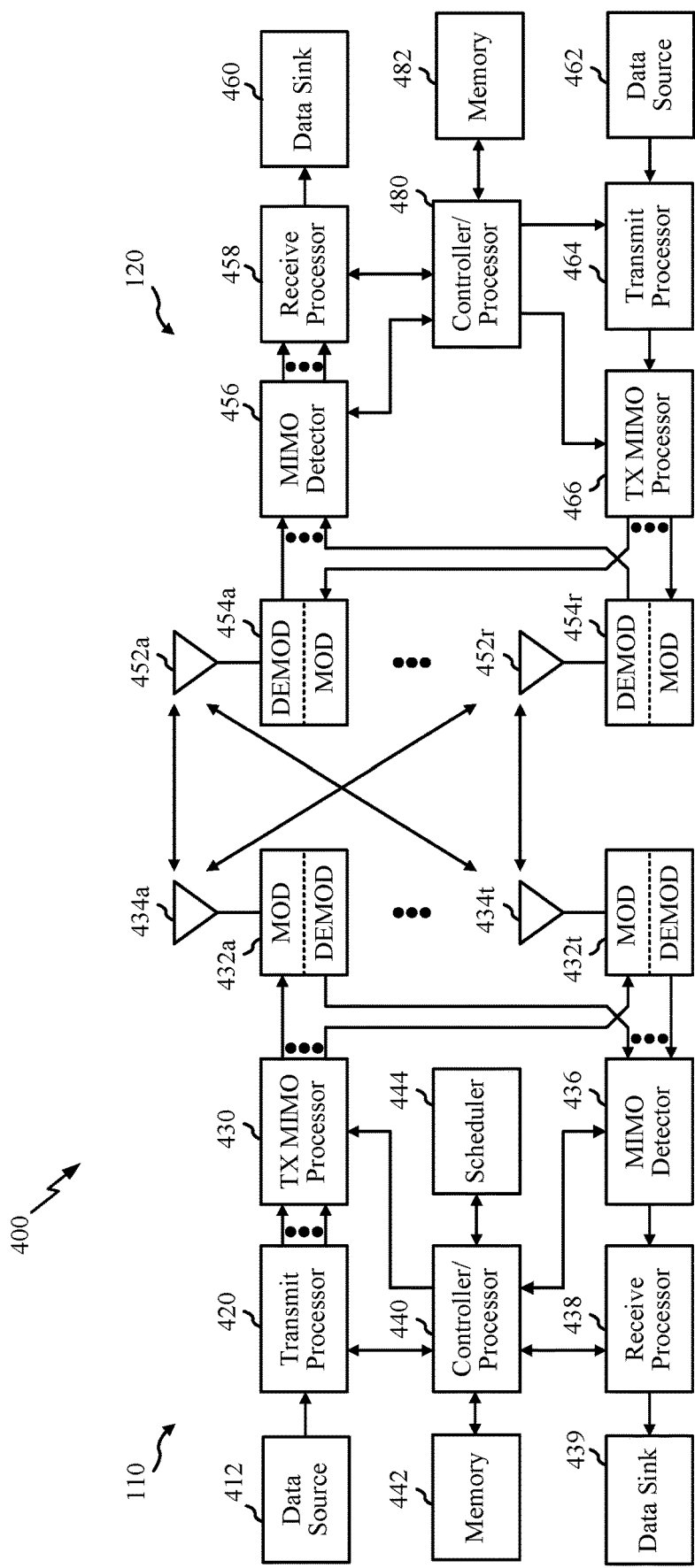
FIG. 4 is a block diagram conceptually illustrating a design of an example BS and UE, in accordance with certain aspects of the present disclosure.

FIG. 4 illustrates example components of the BS 110 (e.g., a TRP or gNB) and UE 120 illustrated in FIG. 1, which may be used to implement aspects of the present disclosure.

Figure 8:
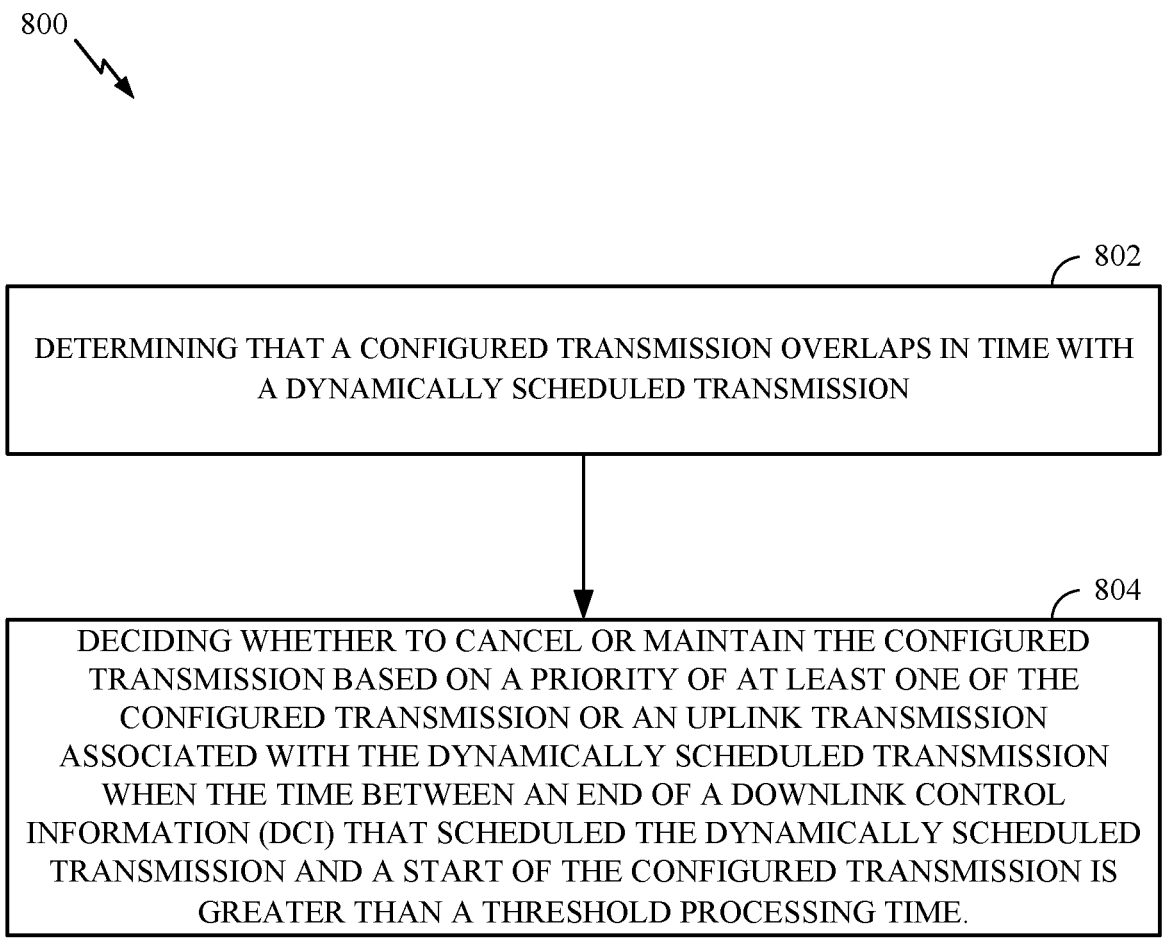
FIG. 8 illustrates example operations for wireless communications by a user equipment (UE), in accordance with aspects of the present disclosure.

As an example, one or more of the antennas 452, DEMOD/MOD 454, processors 466, 458, 464, and/or controller/processor 480 of the UE 120 may be configured to perform the operations described herein (e.g., operations 800 of FIG. 8). Similarly, one or more of the 434, DEMOD/MOD 432, processors 430, 420, 438 and/or controller/processor 440 of the BS 110 may be configured to perform the operations described herein (e.g., operations 900 of FIG. 9).

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIG. 8 and/or other processes for the techniques described herein and those illustrated in the appended drawings. The processor 440 and/or other processors and modules at the BS 110 may perform or direct processes for the techniques described with reference to FIG. 9 and/or other processes for the techniques described herein and those illustrated in the appended drawings. The memories 442 and 482 may store data and program codes for the BS 110 and the UE 120, respectively.

Figure 5:
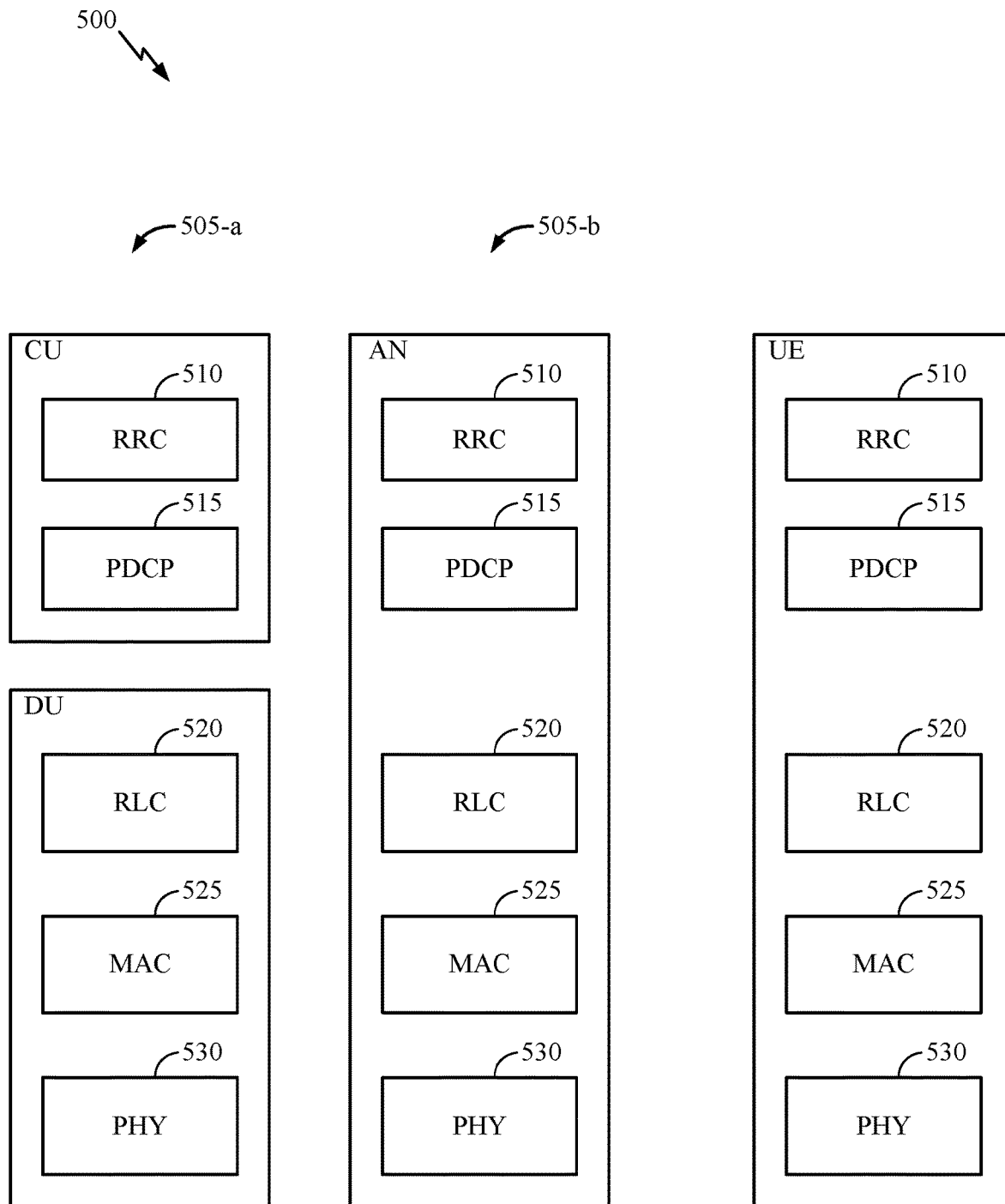
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
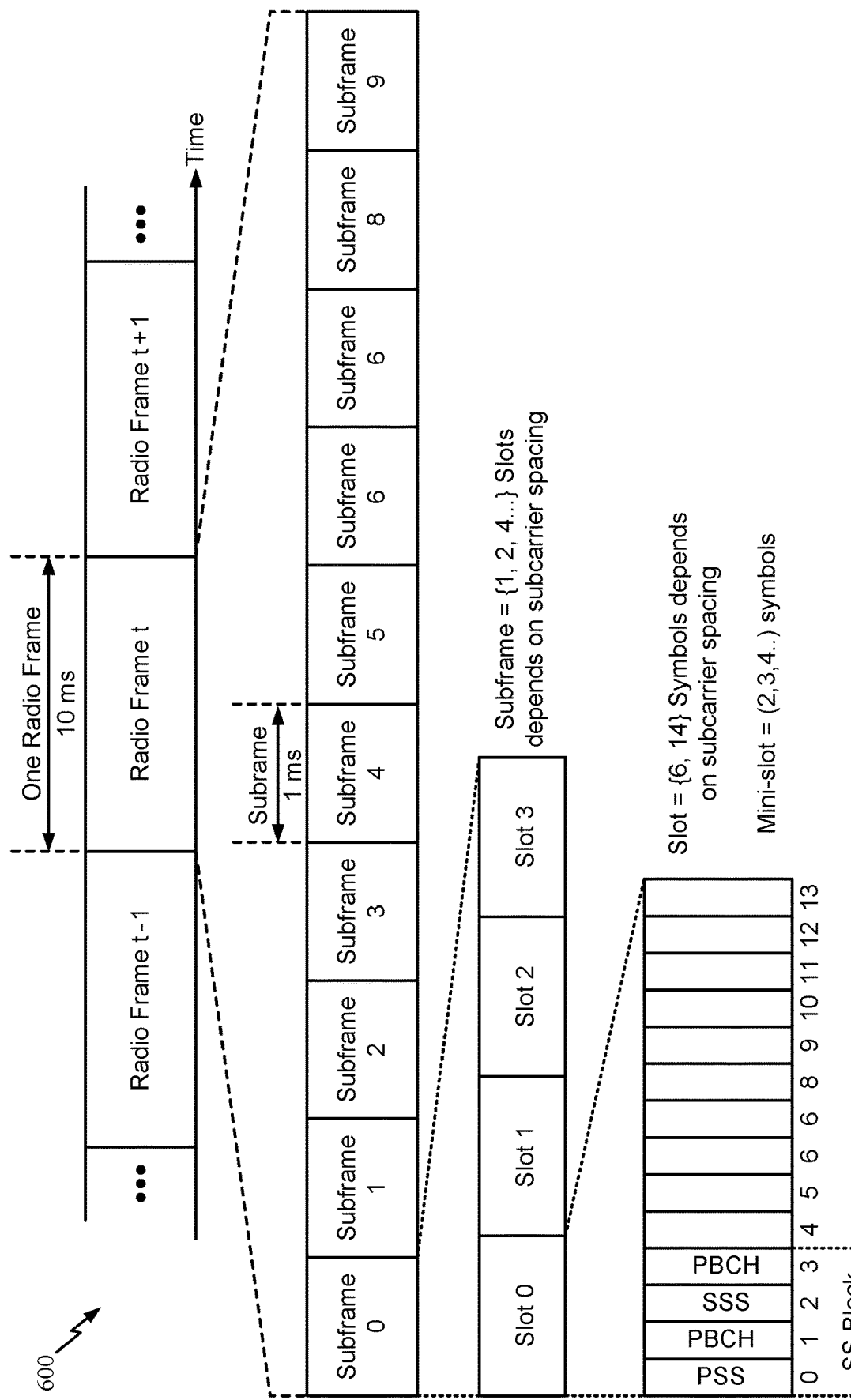
FIG. 6 illustrates an example of a frame format for a new radio (NR) system.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Priority Based Configured Transmission Cancellation by Dynamic Grant

Aspects of the present disclosure relate to wireless communications, and more particularly, to mechanisms for priority based decisions regarding when to cancel or maintain configured transmissions that overlap with dynamically scheduled transmissions.

SPS resource allocation, which is sometimes called configured downlink assignment, refers to a scheduling technique where a user-equipment (UE) is pre-configured by the network/base station (e.g., eNBs, gNB, etc.) with a periodicity and an offset.

Figure 7A:
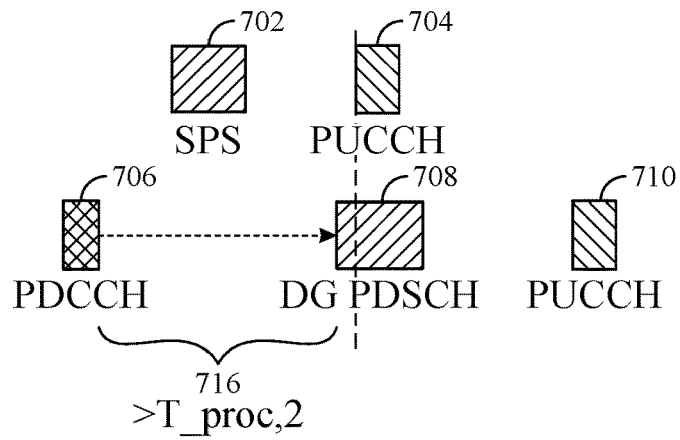
FIGS. 7A-7C illustrate various scenarios where configured transmissions overlap with dynamically scheduled transmissions that may be addressed in accordance with aspects of the present disclosure.

As illustrated in FIG. 7A, once pre-configured, if the UE were to receive an allocation of downlink resources, then the allocation of SPS occasions would repeat according to the pre-configured periodicity, resulting in periodic SPS (downlink) transmissions (e.g., physical downlink shared channel PDSCH transmissions). For SPS, the base station may use Radio Resource Control (RRC) signaling to define the periodicity of configured downlink assignments. Similarly, once configured with configured grants (CGs) for uplink transmissions, the allocation of CG occasions may repeat according to the pre-configured periodicity.

In current systems, CGs are semi-statically activated either by radio resource control (RRC) or downlink control information (DCI) signalling. In some cases, an UL data packet in a CG occasion may be triggered by a decoded DL data packet in an SPS occasion (e.g., to report action status in response to new input/command from DL). In some cases, a UE may provide acknowledgment (e.g., hybrid automatic repeat request or HARQ) feedback, indicating whether it received a PDSCH transmission in one or more of the configured SPS occasions. In some systems, a PUCCH resource may be used to provide acknowledgment feedback for the SPS 702.

In some cases, configured transmissions may overlap in time with dynamically scheduled transmissions, generally referring to transmissions scheduled by (uplink or downlink) grants signaled via a downlink control information (DCI) carried in a physical downlink control channel (PDCCH).

Figure 7B:
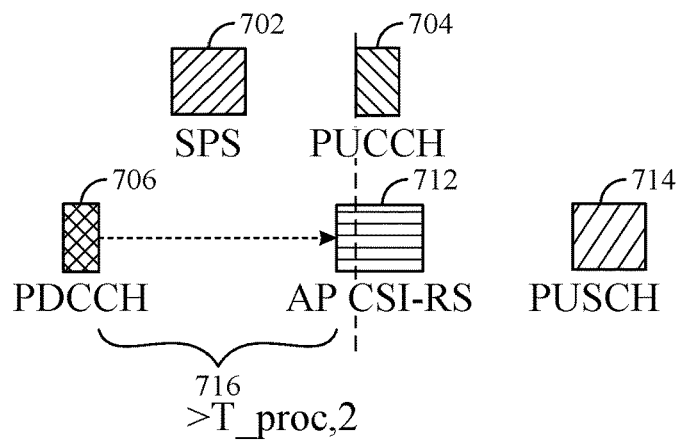
Figure 7C:
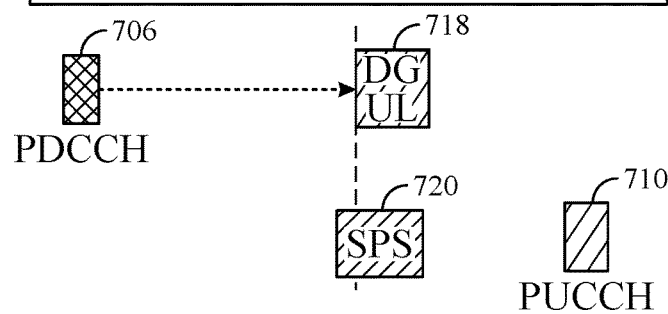

FIGS. 7A and 7B illustrate example diagrams 700A and 700B, where configured uplink transmissions overlap with dynamically scheduled downlink transmission. FIG. 7C illustrates an example diagram 700C, where a configured downlink transmission overlaps with a dynamically scheduled uplink transmission As illustrated in FIGS. 7A and 7B, if downlink control information (DCI) 706 of a particular format (e.g., DCI formats 0_0, 0_1, 1_0, 1_1, or 2_3) dynamically schedules PDSCH 708 or aperiodic (AP) channel state information reference signal 712 (CSI-RS) that overlaps with a configured uplink transmission 704 (e.g., feedback for an SPS).

In such cases, according to current systems, a UE will cancel the configured uplink transmission 704 (e.g., the SPS feedback) if the time 716 between the end of DCI 706 and the start of configured uplink transmission 704 is greater than a UE processing time (e.g., the PUSCH preparation time, T_proc,2, meaning the UE has sufficient time to process the dynamically schedule transmission). In such systems, the configured uplink transmission 704 is cancelled even if it has high priority (e.g., physical (PHY) priority), regardless of whether the overlapped PDSCH 708 and/or AP CSI-RS 712 has a high or low priority based on an associated PUCCH 710 or PUSCH 714.

Similarly, in the example shown in FIG. 7C, a configured downlink transmission 720 that overlaps with a dynamically scheduled uplink transmission 718 may be cancelled regardless of priority.

Rather than automatically cancel configured transmissions, regardless of priority, aspects of the present disclosure provide for priority based decisions regarding when to cancel or maintain configured transmissions that overlap with dynamically scheduled transmissions.

FIG. 8 illustrates example operations 800 for wireless communications by a UE. Operations 800 may be performed, for example, by a UE 120 (e.g., UE 120) participating in communications with a base station to make priority based decisions regarding configured transmissions overlapping with dynamically scheduled transmissions.

Operations 800 begin, at 802, by determining that a configured transmission overlaps in time with a dynamically scheduled transmission. For example, the UE may determine a configured uplink transmission overlaps with a dynamically scheduled downlink transmission (as shown in FIGS. 7A and 7B) or that a configured downlink transmission overlaps with a dynamically scheduled uplink transmission (as shown in FIG. 7C).

At 804, the UE decides whether to cancel or maintain the configured transmission based on a priority of at least one of the configured transmission or an uplink transmission associated with the dynamically scheduled transmission when the time between an end of a downlink control information (DCI) that scheduled the dynamically scheduled transmission and a start of the configured transmission is greater than a threshold processing time. One example of an uplink transmission associated with a dynamically scheduled transmission is a PUCCH carrying acknowledgment feedback for a dynamically scheduled downlink transmission. Another example of an uplink transmission associated with a dynamically scheduled transmission is a PUSCH carrying a measurement report based on (dynamically scheduled) CSI-RS or PRS.

Figure 9:
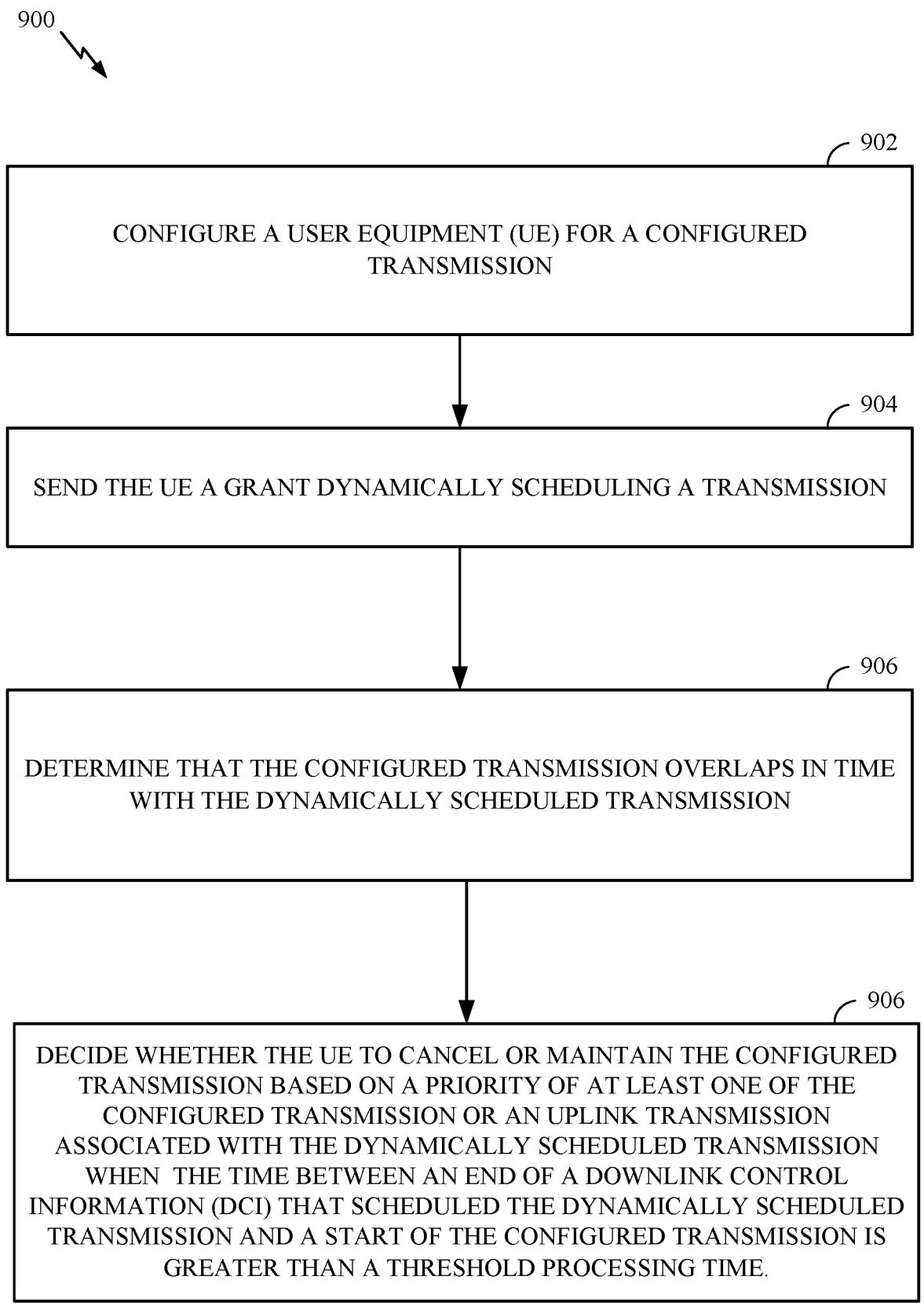
FIG. 9 illustrates example operations for wireless communications by a network entity, in accordance with aspects of the present disclosure.

FIG. 9 illustrates example operations 900 that may be performed by a network entity and may be considered complementary to operations 800 of FIG. 8. For example, operations 900 may be performed by a gNB to communicate with a UE (e.g., a UE performing operations 800 of FIG. 8) to make priority based decisions regarding configured transmissions overlapping with dynamically scheduled transmissions.

Operations 900 begin, at 902, by configuring a user equipment (UE) for a configured transmission. At 904, the network entity sends the UE a grant dynamically scheduling a transmission. At 906, the network entity determines that the configured transmission overlaps in time with the dynamically scheduled transmission. At 908, the network entity deciding whether the UE to cancel or maintain the configured transmission based on a priority of at least one of the configured transmission or an uplink transmission associated with the dynamically scheduled transmission when the time between an end of a downlink control information (DCI) that scheduled the dynamically scheduled transmission and a start of the configured transmission is greater than a threshold processing time.

In certain aspects, when a configured uplink transmission overlaps a dynamically scheduled downlink transmission, with time between the end of DCI and the start of the configured uplink transmission being greater than a UE processing time, the configured transmission cancellation may depend on a priority of the configured transmission and/or a priority of PUCCH/PUSCH associated with the dynamically scheduled downlink transmission.

The configured uplink transmission may be persistent/semi-persistent sounding reference signal (SRS), a configured grant (CG), or persistent/semi-persistent/SPS PUCCH, while the dynamically scheduled transmission may be PDSCH, semi-persistent/aperiodic CSI-RS, or semi-persistent/aperiodic PRS.

In some cases, the UE may not be expected to have a high priority configured uplink transmission that overlaps with a downlink dynamic grant. Thus, in such cases this occurs, the UE may decide to maintain (not cancel) the configured uplink transmission, at least when the priority of the PUCCH/PUSCH associated with the downlink dynamic grant is low (or at least lower priority relative to the configured uplink transmission). An example of how one type of transmission may be higher priority than another is that URLLC may have higher priority than eMBB traffic. As another example, certain measurement reports may have high priority in order to adapt to changing channel conditions and maintain sufficient link quality.

In certain aspects, as shown in the table of FIG. 10A, a cancellation rule may be specified for different combinations of priority for the configured uplink transmission and an uplink transmission associated with the dynamically scheduled transmission. In other words, the configured uplink transmission may be cancelled or maintained based on the priority combination (one of four as shown in the Table) of the configured uplink transmission and the uplink transmission associated with the downlink dynamic grant.

In cases where the configured uplink transmission is maintained, the dynamically scheduled downlink transmission may not be transmitted, at least over the overlapped symbols. In cases where the dynamically scheduled downlink transmission is a PDSCH, the PDSCH may at least be rate matched around the configured uplink transmission.

In certain aspects, when a configured downlink transmission overlaps a dynamically scheduled uplink transmission, cancelling the configured downlink transmission may depend on a priority of the dynamically scheduled uplink transmission and/or a priority of PUCCH/PUSCH associated with the configured downlink transmission.

In either case, the configured downlink transmission may be persistent/semi-persistent CSI-RS, persistent/semi-persistent/SPS, SPS, or synchronization signal block (SSB), while the dynamically scheduled uplink transmission may be PUSCH, semi-persistent/aperiodic SRS, or physical random access channel (PRACH).

In some cases, if the PUCCH/PUSCH associated with the configured downlink transmission has high priority, the UE may not be expected to have the configured downlink transmission overlap with dynamically scheduled uplink transmission. In such cases, the UE may decide to maintain the configured downlink transmission (e.g., at least when the priority of the dynamically scheduled uplink transmission is lower than uplink transmission associated with the configured downlink transmission).

In certain aspects, as shown in FIG. 10B, a cancellation rule may be specified for different combinations of priority of the uplink transmission associated with the configured downlink transmission and the dynamically scheduled uplink transmission. In other words, the configured downlink transmission may be either canceled or maintained based on the combination of priorities.

In one case where the configured downlink transmission is maintained, the dynamically scheduled uplink transmission may not be transmitted at least over the overlapped symbols. In case the dynamically scheduled uplink transmission is PUSCH, the PUSCH may be rate matched around the configured downlink transmission.

In 3GPP release 16, multi-TRP (transmit-receive point) feature has been introduced, and UE can receive two PDSCHs simultaneously from both TRPs. However for UE supporting multi-TRP feature, the UE may prefer to disable it for power saving purposes. For example, a capable UE with short remaining battery life may only activate a single Rx panel at one time and keep other panels in sleep mode. In this scenario, it would be beneficial for UE to recommend disabling the multi-TRP feature, which includes SDM/TDM/FDM based DL receptions from different TRPs or UL transmissions to different TRPs, which can be scheduled by a single DCI sent from one TRP or by multiple DCIs sent from different TRPs. DL receptions include any combinations of PDCCH, PDSCH, CSI-RS, SSB, PRS (positioning RS), while UL transmissions include any combinations of PUCCH, PUSCH, SRS, PRACH. The UE request for disabling the multi-TRP feature can be transmitted in MAC-CE or RRC message, including UE assistance information for power saving purpose.

In 3GPP release 16, in FR2, for a given SRS or PUSCH transmission, the pathloss RS for the UL Tx power determination and the spatial RS for the UL beam determination are indicated by separate signaling, i.e. the pathloss RS is indicated by MAC-CE, while the beam indication RS is indicated by DCI. To save signaling latency/overhead, UL TCI state (transmission configuration indication) can be introduced, and each configured UL TCI state can contain both spatial RS and pathloss RS. The base station indicates the corresponding UL TCI state for each scheduled or configured UL transmission. Through the indicated UL TCI state, UE can know both UL beam and pathloss RS for the corresponding UL transmission. Besides spatial RS and pathloss RS, each configured UL TCI state may also include additional power control parameters to determine the UL Tx power, e.g. P0, alpha, and closed loop index. The base station can indicate one or multiple UL TCI states for one or multiple UL transmissions, which includes PUCCH, PUSCH, SRS, PRACH. In 3GPP release 16, the concept of default UL beam and pathloss RS is introduced to save UL beam and pathloss RS switch latency/overhead. The default UL beam and pathloss RS for SRS or PUCCH without configured spatial relation info will follow the beam and corresponding QCL-TypeD RS of CORESET with lowest ID or the activated PDSCH TCI state with lowest ID in active BWP. It would be beneficial to extend this feature to multi-TRP scenario, where multiple default UL beams and default pathloss RSs can be introduced with each UL default beam and each default pathloss RS defined per TRP. When an UL transmission is scheduled by one TRP but without indication for the used UL beam or pathloss RS, the UL default beam and default pathloss RS defined for the scheduling TRP will be used for the scheduled UL transmission, which includes PUCCH, PUSCH, SRS, PRACH. The UL default beam and default pathloss RS per TRP can be defined as the beam and corresponding QCL-TypeD RS of CORESET with lowest ID among the CORESETs associated with same TRP index in active BWP. Besides default UL beam and pathloss RS, additional default power control parameters can be defined per TRP to compute the UL Tx power, and include P0, alpha, and closed loop index.

Therefore, automatic cancellation of configured transmissions can be avoided by making priority based decisions regarding when to cancel or maintain configured transmissions that overlap with dynamically scheduled transmissions if the time between an end of a downlink control information (DCI) that scheduled the dynamically scheduled transmission and a start of the configured transmission is greater than a threshold processing time.

Example Communications Devices

Figure 11:
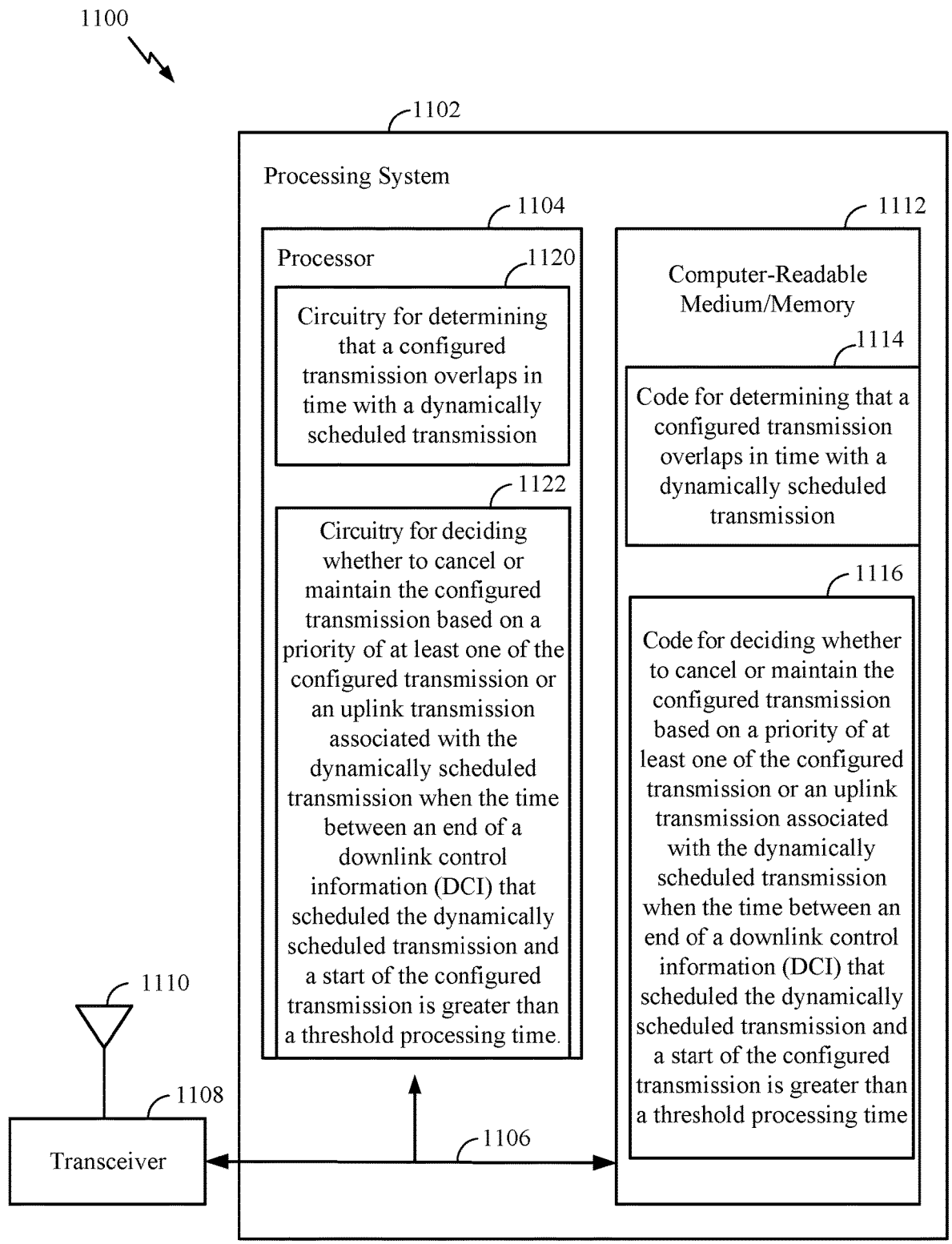
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein. In certain aspects, computer-readable medium/memory 1112 stores code 1114 for determining that a configured transmission overlaps in time with a dynamically scheduled transmission; and code 1116 for deciding whether to cancel or maintain the configured transmission based on a priority of at least one of the configured transmission or an uplink transmission associated with the dynamically scheduled transmission when the time between an end of a downlink control information (DCI) that scheduled the dynamically scheduled transmission and a start of the configured transmission is greater than a threshold processing time. In certain aspects, the processor 1104 has circuitry configured to implement the code stored in the computer-readable medium/memory 1112. The processor 1104 includes circuitry 1120 for determining that a configured transmission overlaps in time with a dynamically scheduled transmission; and circuitry 1122 for deciding whether to cancel or maintain the configured transmission based on a priority of at least one of the configured transmission or an uplink transmission associated with the dynamically scheduled transmission when the time between an end of a downlink control information (DCI) that scheduled the dynamically scheduled transmission and a start of the configured transmission is greater than a threshold processing time.

Figure 12:
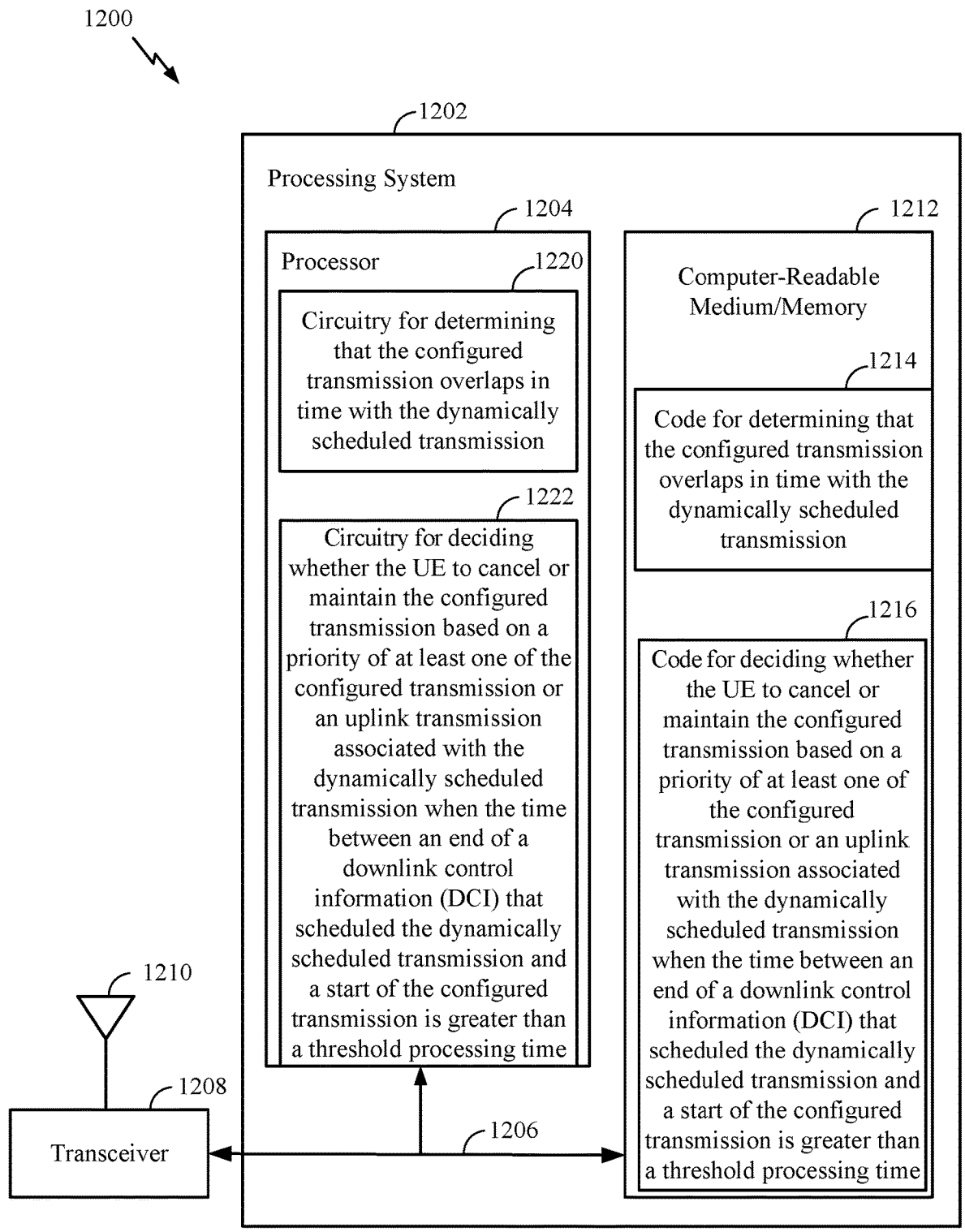
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9, or other operations for performing the various techniques discussed herein. In certain aspects, computer-readable medium/memory 1212 stores code 1214 for determining that the configured transmission overlaps in time with the dynamically scheduled transmission; and code 1216 for deciding whether the UE to cancel or maintain the configured transmission based on a priority of at least one of the configured transmission or an uplink transmission associated with the dynamically scheduled transmission when at least one condition is met. In certain aspects, the processor 1204 has circuitry configured to implement the code stored in the computer-readable medium/memory 1212. The processor 1204 includes circuitry 1220 for determining that the configured transmission overlaps in time with the dynamically scheduled transmission; and circuitry 1222 deciding whether the UE to cancel or maintain the configured transmission based on a priority of at least one of the configured transmission or an uplink transmission associated with the dynamically scheduled transmission when at least one condition is met.

Example Aspects

In addition to the various aspects described above, specific combinations of aspects are within the scope of the disclosure, some of which are detailed below:

Aspect 1: A method for wireless communications by a user equipment (UE), comprising determining that a configured transmission overlaps in time with a dynamically scheduled transmission; and deciding whether to cancel or maintain the configured transmission based on a priority of at least one of the configured transmission or an uplink transmission associated with the dynamically scheduled transmission when at least one condition is met.

Aspect 2: The method of Aspect 1, wherein the at least one condition comprises a time between an end of a downlink control information (DCI) that scheduled the dynamically scheduled transmission and a start of the configured transmission is greater than a threshold processing time.

Aspect 3: The method of Aspect 1 or 2, wherein priorities of the configured transmission and uplink transmission associated with the dynamically scheduled transmission are based on associated service types of the configured transmission and uplink transmission associated with the dynamically scheduled transmission.

Aspect 4: The method of any of Aspects 1-3, wherein priority of the configured transmission is determined via at least one of: a radio resource control (RRC) message, downlink control information (DCI) activating the configured transmission, or a type of information carried in the configured transmission.

Aspect 5: The method of Aspect 4, wherein the type of information includes at least one of acknowledgement feedback, a serving request, a layer-1 (L1) metric feedback including L1-reference signal received power (RSRP) and L1-signal to interference and noise ratio (SINR), or channel state feedback, wherein the channel state feedback includes at least one of a channel quality indicator (CQI), a precoding matrix indicator (PMI), or a rank indicator (RI).

Aspect 6: The method of any of Aspects 1-4, wherein priority of the uplink transmission associated with the dynamically scheduled transmission is determined by at least one of DCI scheduling the dynamically scheduled transmission or a type of information carried in the uplink transmission associated with the dynamically scheduled transmission.

Aspect 7: The method of Aspect 6, wherein the type of information includes at least one of acknowledgement feedback, a serving request, a layer-1 (L1) metric feedback including L1-reference signal received power (RSRP) and L1-signal to interference and noise ratio (SINR), or channel state feedback, wherein the channel state feedback includes at least one of a channel quality indicator (CQI), a precoding matrix indicator (PMI), or a rank indicator (RI).

Aspect 8: The method of any of Aspects 1-4 or 6, wherein the configured transmission comprises a configured uplink transmission; and the dynamically scheduled transmission comprises a dynamically scheduled downlink transmission.

Aspect 9: The method of Aspect 8, wherein the configured uplink transmission comprises at least one of a periodic or semi-persistently scheduled (SPS) sounding reference signal (SRS), a configured grant, or a periodic, semi-persistent, or SPS physical uplink control channel (PUCCH); and the dynamically scheduled downlink transmission comprises at least one of a physical downlink shared channel (PDSCH), semi-persistent or aperiodic channel state information reference signal (CSI-RS), or semi-persistent or aperiodic position reference signal (PRS).

Aspect 10: The method of Aspect 9, wherein the uplink transmission associated with the dynamically scheduled downlink transmission comprises at least one of a PUCCH for acknowledging the dynamically scheduled downlink transmission or a physical uplink shared channel (PUSCH) for a measurement report based on CSI-RS or PRS.

Aspect 11: The method of any of Aspects 8-10, wherein the decision is to maintain the configured uplink transmission when a priority of the configured uplink transmission is at least one of a high level or a higher level than the uplink transmission associated with the dynamically scheduled downlink transmission.

Aspect 12: The method of any of Aspects 8-11, wherein the decision of whether to maintain or cancel the configured uplink transmission depends on the priorities of both the configured uplink transmission and the uplink transmission associated with the dynamically scheduled downlink transmission.

Aspect 13: The method of Aspect 12, wherein, when the decision is to maintain the configured uplink transmission, the dynamically scheduled downlink transmission is not transmitted at least in symbols that overlap with the configured uplink transmission.

Aspect 14: The method of Aspect 12 or 13, wherein, when the dynamically scheduled downlink transmission comprises a physical downlink shared channel (PDSCH), the PDSCH is transmitted with rate matching around the configured uplink transmission.

Aspect 15: The method of any of Aspects 1-6 or 8, wherein the configured transmission comprises a configured downlink transmission; and the dynamically scheduled transmission comprises a dynamically scheduled uplink transmission.

Aspect 16: The method of Aspect 15, wherein the dynamically scheduled uplink transmission comprises at least one of a physical uplink shared channel (PUSCH), semi-persistent or aperiodic sounding reference signal (SRS), or physical random access channel (PRACH); and the configured downlink transmission comprises at least one of a periodic or semi-persistent channel state information reference signal (CSI-RS), a periodic or semi-persistent position reference signal (PRS), a semi-persistently scheduled (SPS) physical downlink shared channel (PDSCH), or a synchronization signal block (SSB).

Aspect 17: The method of Aspect 16, wherein the dynamically scheduled uplink transmission comprises at least one of a PUCCH for acknowledging a dynamically scheduled downlink transmission or a physical uplink shared channel for CSI-RS or PRS reporting.

Aspect 18: The method of any of Aspects 15-17, wherein the decision is to maintain the configured downlink transmission when a priority of the uplink transmission associated with the configured downlink transmission is at least one of a high level or a higher level than the dynamically scheduled uplink transmission.

Aspect 19: The method any of Aspects 15-18, wherein the decision of whether to maintain or cancel the configured downlink transmission depends on the priorities of both the uplink transmission associated with the configured downlink transmission and the dynamically scheduled uplink transmission.

Aspect 20: The method of Aspect 19, wherein, when the decision is to maintain the configured downlink transmission, the UE does not transmit the dynamically scheduled uplink transmission at least in symbols that overlap with the configured downlink transmission.

Aspect 21: The method of Aspect 19 or 20, wherein, when the dynamically scheduled uplink transmission comprises a physical uplink shared channel (PUSCH), the UE transmits the PUSCH with rate matching around the configured downlink transmission.

Aspect 22: A method for wireless communications performed by a network entity, comprising configuring a user equipment (UE) for a configured transmission; sending the UE a grant dynamically scheduling a transmission; determining that the configured transmission overlaps in time with the dynamically scheduled transmission; and deciding whether the UE is to cancel or maintain the configured transmission based on a priority of at least one of the configured transmission or an uplink transmission associated with the dynamically scheduled transmission when at least one condition is met.

Aspect 23: The method of Aspect 22, wherein the at least one condition comprises a time between an end of a downlink control information (DCI) that scheduled the dynamically scheduled transmission and a start of the configured transmission is greater than a threshold processing time.

Aspect 24: The method of Aspect 22 or 23, wherein priorities of the configured transmission and uplink transmission associated with the dynamically scheduled transmission are based on associated service types of the configured transmission and uplink transmission associated with the dynamically scheduled transmission.

Aspect 25: The method of any of Aspects 22-24, wherein priority of the configured transmission is determined via at least one of: a radio resource control (RRC) message, downlink control information (DCI) activating the configured transmission, or a type of information carried in the configured transmission.

Aspect 26: The method of Aspect 25, wherein the type of information includes at least one of acknowledgement feedback, a serving request, a layer-1 (L1) metric feedback including L1-reference signal received power (RSRP) and L1-signal to interference and noise ratio (SINR), or channel state feedback, wherein the channel state feedback includes at least one of a channel quality indicator (CQI), a precoding matrix indicator (PMI), or a rank indicator (RI).

Aspect 27: The method of any of Aspects 22-25, wherein priority of the uplink transmission associated with the dynamically scheduled transmission is determined by at least one of DCI scheduling the dynamically scheduled transmission or a type of information carried in the uplink transmission associated with the dynamically scheduled transmission.

Aspect 28: The method of any of Aspect 27, wherein the type of information includes at least one of acknowledgement feedback, a serving request, a layer-1 (L1) metric feedback including L1-reference signal received power (RSRP) and L1-signal to interference and noise ratio (SINR), or channel state feedback, wherein the channel state feedback includes at least one of a channel quality indicator (CQI), a precoding matrix indicator (PMI), or a rank indicator (RI).

Aspect 29: The method of any of Aspects 22-28, the configured transmission comprises a configured uplink transmission; and the dynamically scheduled transmission comprises a dynamically scheduled downlink transmission.

Aspect 30: The method of Aspect 29, wherein the configured uplink transmission comprises at least one of a periodic or semi-persistently scheduled (SPS) sounding reference signal (SRS), a configured grant, or a periodic, semi-persistent, or SPS physical uplink control channel (PUCCH); and the dynamically scheduled downlink transmission comprises at least one of a physical downlink shared channel (PDSCH), semi-persistent or aperiodic channel state information reference signal (CSI-RS), or semi-persistent or aperiodic position reference signal (PRS).

Aspect 31: The method of Aspect 30, wherein the uplink transmission associated with the dynamically scheduled downlink transmission comprises at least one of a PUCCH for acknowledging the dynamically scheduled downlink transmission or a physical uplink shared channel for a measurement report based on CSI-RS or PRS.

Aspect 32: The method of any of Aspects 29-31, wherein the decision is that the UE is to maintain the configured uplink transmission when a priority of the configured uplink transmission is at least one of a high level or a higher level than the uplink transmission associated with the dynamically scheduled downlink transmission.

Aspect 33: The method of any of Aspects 29-32, wherein the decision of whether the UE is to maintain or cancel the configured uplink transmission depends on the priorities of both the configured uplink transmission and the uplink transmission associated with the dynamically scheduled downlink transmission.

Aspect 34: The method of Aspect 33, wherein, when the decision is the UE is to maintain the configured uplink transmission, the network entity does not transmit the dynamically scheduled downlink transmission at least in symbols that overlap with the configured uplink transmission.

Aspect 35: The method of Aspect 33 or 34, wherein, when the dynamically scheduled downlink transmission comprises a physical downlink shared channel (PDSCH), the network entity transmits the PDSCH with rate matching around the configured uplink transmission.

Aspect 36: The method of any of Aspects 22-28, wherein, the configured transmission comprises a configured downlink transmission; and the dynamically scheduled transmission comprises a dynamically scheduled uplink transmission.

Aspect 37: The method of Aspect 36, wherein, the dynamically scheduled uplink transmission comprises at least one of a physical uplink shared channel (PUSCH), semi-persistent or aperiodic sounding reference signal (SRS), or physical random access channel (PRACH); and the configured downlink transmission comprises at least one of a periodic or semi-persistent channel state information reference signal (CSI-RS), a periodic or semi-persistent position reference signal (PRS), a semi-persistently scheduled (SPS) physical downlink shared channel (PDSCH), or a synchronization signal block (SSB).

Aspect 38: The method of Aspect 37, wherein the uplink transmission comprises at least one of a PUCCH or a physical uplink shared channel for CSI-RS or PRS reporting.

Aspect 39: The method of any of Aspects 36-38, wherein the decision is the UE is to maintain the configured downlink transmission when a priority of the uplink transmission associated with the configured downlink transmission is at least one of a high level or a higher level than the dynamically scheduled uplink transmission.

Aspect 40: The method of any of Aspects 36-39, wherein the decision of whether the UE is to maintain or cancel the configured downlink transmission depends on the priorities of both the uplink transmission associated with the configured downlink transmission and the dynamically scheduled uplink transmission.

Aspect 41: The method of any of Aspects 36-40, wherein, when the decision is the UE is to maintain the configured downlink transmission, the UE does not transmit the dynamically scheduled uplink transmission at least in symbols that overlap with the configured downlink transmission.

Aspect 42: The method of Aspect 40, wherein, when the dynamically scheduled uplink transmission comprises a physical uplink shared channel (PUSCH), the UE transmits the PUSCH with rate matching around the configured downlink transmission.

Aspect 42: An apparatus, comprising: a memory comprising executable instructions; and one or more processors configured to execute the executable instructions and cause the apparatus to perform a method in accordance with any one of Aspects 1-41.

Aspect 43: An apparatus, comprising means for performing a method in accordance with any one of Aspects 1-41.

Aspect 44: A non-transitory computer-readable medium comprising executable instructions that, when executed by one or more processors of an apparatus, cause the apparatus to perform a method in accordance with any one of Aspects 1-41.

Aspect 45: A computer program product embodied on a computer-readable storage medium comprising code for performing a method in accordance with any one of Aspects 1-41.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 458, 464, 466, and/or controller/processor 480 of the UE 120 and/or processors 420, 430, 438, and/or controller/processor 440 of the BS 110 shown in FIG. 4 may be configured to perform operations 800 of FIG. 8 and operations 900 of FIG. 9.

Means for receiving may include a receiver such as one or more antennas and/or receive processors illustrated in FIG. 4. Likewise, means for transmitting may include a transmitter such as one or more antennas and/or transmit processors illustrated in FIG. 4. Means for monitory, means for indicating, means for signaling, means for activating, and means for deactivating may include a processing system, which may include one or more processors, such as processors 458, 464, 466, and/or controller/processor 480 of the UE 120 and/or processors 420, 430, 438, and/or controller/processor 440 of the BS 110 shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications performed by a user equipment (UE), comprising:
   determining that a configured transmission overlaps in time with a dynamically scheduled transmission; and
   deciding, when a time between an end of a downlink control information (DCI) that scheduled the dynamically scheduled transmission and a start of the configured transmission is greater than a threshold processing time, whether to cancel or maintain the configured transmission based on a priority of at least one of the configured transmission or an uplink transmission associated with the dynamically scheduled transmission, wherein:
   the priority of the configured transmission and the priority of the uplink transmission associated with the dynamically scheduled transmission are based on associated service types of the configured transmission and uplink transmission associated with the dynamically scheduled transmission;
   the configured transmission comprises a configured uplink transmission;
   the dynamically scheduled transmission comprises a dynamically scheduled downlink transmission;
   the configured uplink transmission comprises at least one of a periodic or semi-persistently scheduled (SPS) sounding reference signal (SRS);
   the dynamically scheduled downlink transmission comprises at least one of a semi-persistent or aperiodic channel state information reference signal (CSI-RS) or semi-persistent or aperiodic position reference signal (PRS);
   the priority of the configured transmission is determined via at least one of a radio resource control (RRC) message, downlink control information (DCI) activating the configured transmission, or a type of information carried in the configured transmission;
   the priority of the uplink transmission associated with the dynamically scheduled transmission is determined by at least one of DCI scheduling the dynamically scheduled transmission or a type of information carried in the uplink transmission associated with the dynamically scheduled transmission; and
   the type of information includes at least one of acknowledgement feedback, a serving request, a layer-1 (L1) metric feedback including L1-reference signal received power (RSRP) and L1-signal to interference and noise ratio (SINR), or channel state feedback, wherein the channel state feedback includes at least one of a channel quality indicator (CQI), a precoding matrix indicator (PMI), or a rank indicator (RI).

2. The method of claim 1, wherein the uplink transmission associated with the dynamically scheduled downlink transmission comprises a physical uplink shared channel (PUSCH) for a measurement report based on the CSI-RS or the PRS.

3. The method of claim 1, wherein the decision is to maintain the configured uplink transmission when the priority of the configured uplink transmission is at least one of a high level or a higher level than the priority of the uplink transmission associated with the dynamically scheduled downlink transmission.

4. The method of claim 1, wherein the decision of whether to maintain or cancel the configured uplink transmission depends on the priorities of both the configured uplink transmission and the uplink transmission associated with the dynamically scheduled downlink transmission.

5. The method of claim 4, wherein, when the decision is to maintain the configured uplink transmission, the dynamically scheduled downlink transmission is not transmitted at least in symbols that overlap with the configured uplink transmission.

6. The method of claim 4, wherein, when the dynamically scheduled downlink transmission comprises a physical downlink shared channel (PDSCH), the PDSCH is transmitted with rate matching around the configured uplink transmission.

7. A method for wireless communications performed by a network entity, comprising:
   configuring a user equipment (UE) for a configured transmission;
   sending the UE a grant dynamically scheduling a transmission;
   determining that the configured transmission overlaps in time with the dynamically scheduled transmission; and
   deciding, when a time between an end of a downlink control information (DCI) that scheduled the dynamically scheduled transmission and a start of the configured transmission is greater than a threshold processing time, whether the UE is to cancel or maintain the configured transmission based on a priority of at least one of the configured transmission or an uplink transmission associated with the dynamically scheduled transmission, wherein:
   the priority of the configured transmission and the priority of the uplink transmission associated with the dynamically scheduled transmission are based on associated service types of the configured transmission and uplink transmission associated with the dynamically scheduled transmission;

the configured transmission comprises a configured uplink transmission;

the dynamically scheduled transmission comprises a dynamically scheduled downlink transmission;

the configured uplink transmission comprises at least one of a periodic or semi-persistently scheduled (SPS) sounding reference signal (SRS);

the dynamically scheduled downlink transmission comprises at least one of a semi-persistent or aperiodic channel state information reference signal (CSI-RS) or semi-persistent or aperiodic position reference signal (PRS);

the priority of the configured transmission is determined via at least one of a radio resource control (RRC) message, downlink control information (DCI) activating the configured transmission, or a type of information carried in the configured transmission;

the priority of the uplink transmission associated with the dynamically scheduled transmission is determined by at least one of DCI scheduling the dynamically scheduled transmission or a type of information carried in the uplink transmission associated with the dynamically scheduled transmission; and the type of information includes at least one of acknowledgement feedback, a serving request, a layer-1 (L1) metric feedback including L1-reference signal received power (RSRP) and L1-signal to interference and noise ratio (SINR), or channel state feedback, wherein the channel state feedback includes at least one of a channel quality indicator (CQI), a precoding matrix indicator (PMI), or a rank indicator (RI).

8. The method of claim 7, wherein:

the decision of whether the UE is to maintain or cancel the configured uplink transmission depends on the priority of the configured uplink transmission and the priority of the uplink transmission associated with the dynamically scheduled downlink transmission; and when the decision is the UE is to maintain the configured uplink transmission, the network entity does not transmit the dynamically scheduled downlink transmission at least in symbols that overlap with the configured uplink transmission.

9. The method of claim 8, wherein, when the dynamically scheduled downlink transmission comprises a physical downlink shared channel (PDSCH), the network entity transmits the PDSCH with rate matching around the configured uplink transmission.

10. A processing system for wireless communications by a user equipment (UE), comprising:

one or more processors individually or collectively configured to execute instructions stored on one or more memories and to cause the UE to:

determine that a configured transmission overlaps in time with a dynamically scheduled transmission; and decide, when a time between an end of a downlink control information (DCI) that scheduled the dynamically scheduled transmission and a start of the configured transmission is greater than a threshold processing time, whether to cancel or maintain the configured transmission based on a priority of at least one of the configured transmission or an uplink transmission associated with the dynamically scheduled transmission, wherein:

the priority of the configured transmission and the priority of the uplink transmission associated with the dynamically scheduled transmission are based on associated service types of the configured transmission and uplink transmission associated with the dynamically scheduled transmission;

the configured transmission comprises a configured uplink transmission;

the dynamically scheduled transmission comprises a dynamically scheduled downlink transmission;

the configured uplink transmission comprises at least one of a periodic or semi-persistently scheduled (SPS) sounding reference signal (SRS);

the dynamically scheduled downlink transmission comprises at least one of a semi-persistent or aperiodic channel state information reference signal (CSI-RS) or semi-persistent or aperiodic position reference signal (PRS);

the priority of the configured transmission is determined via at least one of a radio resource control (RRC) message, downlink control information (DCI) activating the configured transmission, or a type of information carried in the configured transmission;

the priority of the uplink transmission associated with the dynamically scheduled transmission is determined by at least one of DCI scheduling the dynamically scheduled transmission or a type of information carried in the uplink transmission associated with the dynamically scheduled transmission; and the type of information includes at least one of acknowledgement feedback, a serving request, a layer-1 (L1) metric feedback including L1-reference signal received power (RSRP) and L1-signal to interference and noise ratio (SINR), or channel state feedback, wherein the channel state feedback includes at least one of a channel quality indicator (CQI), a precoding matrix indicator (PMI), or a rank indicator (RI).

11. A processing system for wireless communications by a network entity, comprising:

one or more processors individually or collectively configured to execute instructions stored on one or more memories and to cause the network entity to:

configure a user equipment (UE) for a configured transmission;

send the UE a grant dynamically scheduling a transmission;

determine that the configured transmission overlaps in time with the dynamically scheduled transmission; and decide, when a time between an end of a downlink control information (DCI) that scheduled the dynamically scheduled transmission and a start of the configured transmission is greater than a threshold processing time, whether the UE is to cancel or maintain the configured transmission based on a priority of at least one of the configured transmission or an uplink transmission associated with the dynamically scheduled transmission, wherein:

the priority of the configured transmission and the priority of the uplink transmission associated with the dynamically scheduled transmission are based on associated service types of the configured transmission and uplink transmission associated with the dynamically scheduled transmission;

the configured transmission comprises a configured uplink transmission;

the dynamically scheduled transmission comprises a dynamically scheduled downlink transmission;

the configured uplink transmission comprises at least one of a periodic or semi-persistently scheduled (SPS) sounding reference signal (SRS);

the dynamically scheduled downlink transmission comprises at least one of a semi-persistent or aperiodic channel state information reference signal (CSI-RS) or semi-persistent or aperiodic position reference signal (PRS);

the priority of the configured transmission is determined via at least one of a radio resource control (RRC) message, downlink control information (DCI) activating the configured transmission, or a type of information carried in the configured transmission;

the priority of the uplink transmission associated with the dynamically scheduled transmission is determined by at least one of DCI scheduling the dynamically scheduled transmission or a type of information carried in the uplink transmission associated with the dynamically scheduled transmission; and the type of information includes at least one of acknowledgement feedback, a serving request, a layer-1 (L1) metric feedback including L1-reference signal received power (RSRP) and L1-signal to interference and noise ratio (SINR), or channel state feedback, wherein the channel state feedback includes at least one of a channel quality indicator (CQI), a precoding matrix indicator (PMI), or a rank indicator (RI).

* * * * *